United States Patent Office 3,301,527
Patented Jan. 31, 1967

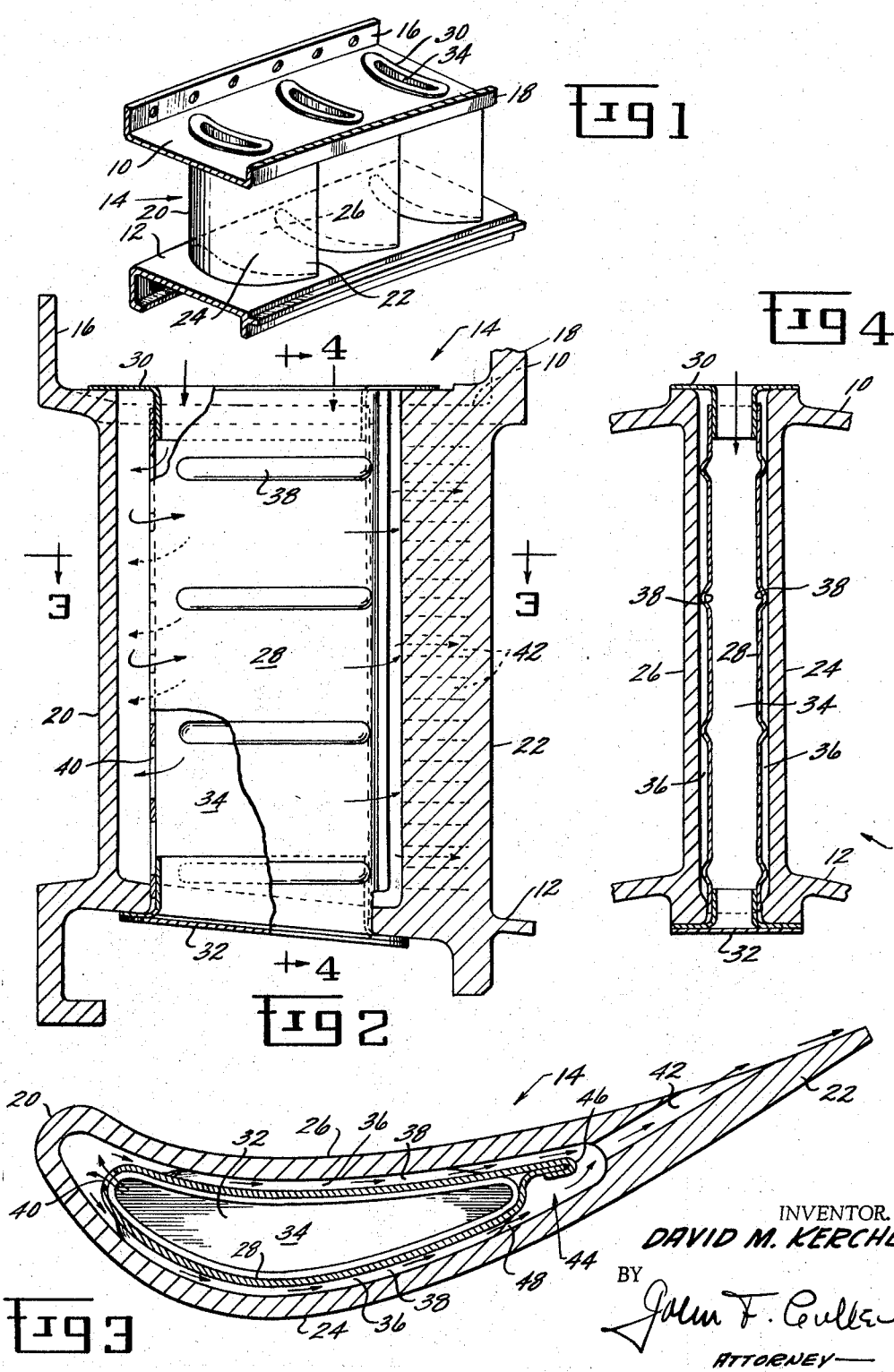

3,301,527
TURBINE DIAPHRAGM STRUCTURE
David Max Kercher, Cincinnati, Ohio, assignor to General Electric Company, a corporation of New York
Filed May 3, 1965, Ser. No. 452,682
8 Claims. (Cl. 253—39.1)

The present invention relates to turbine diaphragm structure and, more particularly, to such structure employing hollow blade means with an insert for predetermining fluid flow for adequate cooling.

In the present day high temperature machine parts such as the turbine blades in jet engines, whether rotating or stationary, it is necessary to provide cooling arrangements. It is possible to design engines that operate efficiently at gas temperatures much higher than the materials are able to withstand. Thus, adequate cooling schemes must be devised and structures designed which permit operation at elevated gas temperatures beyond the capacity of the materials.

Various nozzle vane structures have been designed to permit the circulation of cooling fluids and adequately reduce temperatures. Typically, some designs employ cast-in cooling passages wherein cooling fluids are circulated through the passages within the walls of the particular component such as a turbine bucket or vane. The difficulty with such designs is that the amount of fluid required in relation to the wall thickness is such that very small wall thickness is left between the individual cooling passages and the blade surfaces. The result is that temperature gradients occur producing thermal stress concentrations which often result in cracking and inadequate life.

A more optimum design for high temperature application has proven to be hollow designs that are either fabricated or cast. On thin wall constructions, means such as inserts, are provided to confine and guide the cooling fluid adequately to cool the surface of the blade exposed to the hot fluids. Generally, in such structures the insert acts as a plenum to collect the incoming cooling fluid and discharge it substantially equally within the airfoil blade to flow along the surfaces towards the trailing edge and then use it to cool the trailing edge by flowing it through or on one side or the other thereof and then discharge it into the cycle to avoid losses. A difficulty is that different parts of the cooled element are not at the same temperatures due to different heat loads imposed. In other words, in an airfoil blade, the suction or convex side of the airfoil is generally hotter than the pressure or concave side, and yet both sides are cooled substantially with equal cooling flow. This tends to overcool the pressure surface and undercool the suction surface. As a result stresses are set up between the sides as well as making the hot suction side the determining factor even though the pressure side may require less cooling.

The main object of the present invention is to provide a turbine diaphragm structure wherein each vane is hollow and has an insert disposed therein to guide cooling fluid, the insert being so formed to predetermine the flow through passages between the insert and the hollow blade.

Another object is to provide such a structure wherein the parts may be of uniform thickness for uniform thermal expansion and yet the flow may be unevenly directed to do the most efficient cooling.

A further object is to provide such a structure wherein the insert of the hollow blade means is formed to provide a diffusion section at the trailing edge such that the flow is predetermined so that more flow occurs along the suction surface than the pressure surface.

Briefly stated, the invention provides a turbine diaphragm structure which has spaced nozzle vanes and each vane comprises a hollow blade means of airfoil shape having a leading and trailing edge. A thin walled hollow fluid conducting insert is disposed in the blade and is spaced from the blade to extend substantially contiguous thereto and define fluid passages along the inner side of the airfoil pressure and suction surfaces. The insert has slot means oriented to discharge fluid onto the inner surface of the leading edge to cool the surface and to spread the flow through the passages rearwardly toward the trailing edge. The insert is formed to provide a diffusion section inside of the blade means which section is formed at the trailing edge to predetermine the flow through the passages such that a larger quantity of fluid flows along the suction side and a smaller quantity along the pressure side, the two fluids mixing and being discharged adjacent the trailing edge for cooling thereof.

While the specification concludes with claims particularly pointing out and distinctly claiming the subject matter which is regarded as the invention, it is believed the invention will be better understood from the following description taken in connection with the accompanying drawings, in which:

FIGURE 1 is a partial perspective view of a typical segment of a turbine diaphragm structure;

FIGURE 2 is a partial cross-sectional view through a single hollow blade;

FIGURE 3 is an enlarged cross-sectional view taken on the line 3—3 of FIGURE 2; and FIGURE 4 is a cross-sectional view on the line 4—4 of FIGURE 2.

The present structure is described for illustration as one of the blades of a turbine diaphragm structure but it will be appreciated that the specific structure described may have application elsewhere such as struts or other engine components requiring similar cooling capacities.

Referring first to FIGURE 1, there is shown a turbine diaphragm structure including outer band 10 and inner band 12 having spaced nozzle vanes 14 therein. It will be appreciated that the turbine diaphragm structure extends completely around an annulus downstream of the combustor and therefore receives the hot combustor gases in a gas turbine application. Additionally, such nozzle vanes may be employed as other stages in a multi stage application. They direct the hot gases onto the rotating buckets, not shown, in the usual manner. Ease of assembly and lower cost construction has indicated that the diaphragm structure may conveniently be made in segments as shown in FIGURE 1 which segments can be cast with the individual nozzle vanes 14 therein and the segments are then joined to form a complete circle.

In order that adequate cooling may be obtained of the individual nozzle vanes 14 so that their temperature may be maintained well below the main gas temperature, it is necessary to cool the vanes with a fluid, such as compressor bleed in a gas turbine, or other suitable available fluid at a lower temperature than the exhaust gases. Referring to FIGURE 2, the bands may have upstream flanges 16 and downstream flanges 18 to abut the normal adjacent structure for axial loads in the conventional manner. For purposes of keeping the costs reduced and obtaining high heat transfer coefficients for adequate cooling, it is possible to cast the whole structure shown in FIGURE 1 and bolt individual segments together as previously noted.

Reference is now made to FIGURE 3 showing a cross-section of an individual blade means or hollow vane 14. In the normal nozzle structure the hollow blade means 14 is composed of airfoil shape and has a leading and trailing edge 20 and 22, respectively. The airfoil shape provides a suction or convex surface 24 and a pressure or concave surface 26. In normal expected operation, surface 24 is exposed to higher outside surface heat transfer coefficients than is surface 26 and therefore requires more internal cooling.

Cooling fluid from a suitable source, such as compressor bleed, is brought to the individual blade means in any conventional manner. In order to distribute the fluid properly within the thin walled blade means there is provided therein an insert 28. As seen in FIGURE 2, the incoming fluid flow shown by the arrows is isolated within the nozzle vanes by sealing the insert with a cap 30 at one end and a complete closure 32 at the opposite end. The insert 28 may be suitably welded or otherwise secured to the sealing means so that all of the fluid is forced into the interior or plenum 34 formed by the hollow insert.

The cooling fluid is distributed to cool the nozzle vanes 14 by spacing the insert 28 from the suction and pressure surfaces 24 and 26 so as to define fluid passages 36 along the inner side of the airfoil surfaces between the airfoil and the insert as seen in FIGURES 3 and 4. Inasmuch as the incoming fluid is at a higher pressure than that in the passages 36, as will be apparent, it is necessary to support the insert against distortion and this is done by spaced rib means 38 which serves the multiple purposes of maintaining the passages 36 of the desired predetermined depth and providing rigidity to nozzle vanes 14 as well as guiding means for the fluid. It has been found that impingement cooling along the hot leading edge is more effective than cooling obtained by flow parallel to the edge and for this purpose, the leading edge of the insert is provided with a series of openings, such as apertures 40 oriented to direct all the fluid from plenum 34 to discharge it by impingement on the leading edge inner surface of the blade means so that it spreads to flow rearwardly as shown in FIGURE 3 through the passages 36 toward the trailing edge. The insert 28, in order to obtain the best cooling provides impingement cooling on the leading edge as described and is so formed to be substantially contiguous with the inside of the blade means as shown in FIGURE 3. The divided flow is then discharged through opening means 42 adjacent the trailing edge 22 of the blade means and preferably on the pressure surface thereof to maintain losses at a minimum.

In the normal blade structure of the general type to which the instant invention is directed, the suction or convex surface 24 generally operates hotter than the pressure or concave surface 26. Because of this, it is desirable to provide more cooling flow next to the hotter suction surface. Merely moving the insert to vary the size of passages 36 is inadequate because the aerodynamics and heat transfer characteristics are such that, as the passage 36 is decreased, the flow decreases and also the temperature of the coolant increases whereas the heat transfer coefficient has increased only negligibly and thus the ability to cool is significantly reduced. In other words, one cannot move the insert around sufficiently to obtain the relative cooling necessary so that some means must be provided to ensure more flow along the hotter surface. To this end, the present invention provides a diffusion section generally indicated at 44 in the blade means. The diffusion section may be provided by forming the insert at the trailing edge as shown in FIGURE 3.

Normally, the static pressure at the trailing edge 46 of the insert is the same in both passages 36 on the suction and pressure side. By providing the diffusing section 44, it will then be apparent that the static pressure at 48 is lower than at 46. The lower pressure results in increased velocity which, in turn, means more flow. The diffusing section then acts like a pump or a syphon to predetermine the flow division of the fluid exiting from slot 40 and flowing through the passages 36. Thus, more fluid goes through the passage on the suction side 24 than on the pressure side 26. This is precisely what is needed to provide uniformity of cooling on the blade structure to minimize stresses and to provide uniform thermal expansion. In other words, uneven cooling is obtained to match the uneven heat loads to which the blade means is subjected. As will be apparent the diffusion section is provided on the inner side of the suction surface since this is the side that must have the higher flow. Its length and flow area increase depends on the pressure differential desired.

The diffusion section 44 may be formed in any suitable manner to provide adequate diffusion and as shown, may be conveniently formed by necking down the insert at its trailing edge towards the pressure surface 26 of the blade means. The only determining factors are one of convenience of manufacture satisfaction of correct diffusion of the flow. The necking down structure as shown has been found to be adequate. The significant point is that a diffusion section is provided at the trailing edge and this diffusion section predetermines the flow through the passages to provide a greater amount through the suction surface than the pressure surface. This, in combination with the impingement cooling of the leading edge provides an overall vane construction which expands uniformly, cools unevenly to compensate for the uneven heating, and is a relatively stress-free construction.

While there has been described a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

I claim:
1. Turbine diaphragm structure having spaced nozzle vanes, each vane comprising,
   a hollow blade means with a leading and trailing edge,
   a thin walled insert disposed in said blade and spaced therefrom to define passages,
   said insert having apertures oriented to discharge fluid on the leading edge inner surface to spread and flow through said passages toward said trailing edge,
   said insert being formed to provide a diffusion section at the trailing edge to predetermine the flow through said passages, and
   means to discharge said fluid adjacent the trailing edge.

2. Apparatus as described in claim 1 wherein said insert has sealing means to force all fluid through said apertures.

3. Apparatus as described in claim 2 wherein said insert has spaced rib means supporting said insert in predetermined space relation to said blade means.

4. Turbine diaphragm structure having spaced nozzle vanes, each vane comprising,
   a hollow blade means of airfoil shape and having a leading and trailing edge,
   a thin walled hollow fluid conducting insert disposed in said blade and spaced therefrom and substantially contiguous thereto to define fluid passages along the inner side of said airfoil pressure and suction surfaces,
   said insert having aperture means oriented to discharge fluid on the leading edge inner surface to spread and flow through said passages toward said trailing edge,
   said insert being formed to provide a diffusion section in said blade means at the trailing edge to predetermine the flow through and passages, and
   means to discharge said fluid adjacent the trailing edge.

5. Apparatus as described in claim 4 wherein said diffusion section is provided on the inner side of said suction surface.

6. Apparatus as described in claim 5 wherein said insert has sealing means at the ends thereof to force all fluid through said aperture means.

7. Apparatus as described in claim 5 wherein said insert has spaced rib means supporting said insert in predetermined spaced relation to said blade means.

8. Apparatus as described in claim 5 wherein said insert is necked down at the trailing edge toward said pressure surface.

References Cited by the Examiner

UNITED STATES PATENTS

| | | | |
|---|---|---|---|
| 2,650,803 | 9/1953 | Rosskopf | 253—39.15 X |
| 2,847,185 | 8/1958 | Petrie et al. | 253—39.15 X |

FOREIGN PATENTS

| | | |
|---|---|---|
| 666,536 | 2/1952 | Great Britain. |
| 685,769 | 1/1953 | Great Britain. |
| 784,196 | 10/1957 | Great Britain. |
| 853,328 | 11/1960 | Great Britain. |

References Cited by the Applicant

UNITED STATES PATENTS

| | | |
|---|---|---|
| 2,879,028 | 3/1959 | Stalker. |
| 3,032,314 | 5/1962 | David. |
| 3,045,965 | 7/1962 | Bowmer. |

MARTIN P. SCHWADRON, *Primary Examiner.*

E. A. POWELL, JR., *Assistant Examiner.*